(12) United States Patent
Kagulian (10) Patent No.: US 10,953,828 B2
(45) Date of Patent: Mar. 23, 2021

(54) VEHICLE FLOTATION SYSTEM

(71) Applicant: Artour Kagulian, Hollywood, FL (US)

(72) Inventor: Artour Kagulian, Hollywood, FL (US)

( * ) Notice: Subject to any disclaimer, the term of this patent is extended or adjusted under 35 U.S.C. 154(b) by 0 days.

(21) Appl. No.: 16/270,581

(22) Filed: Feb. 7, 2019

(65) Prior Publication Data

US 2020/0254949 A1 Aug. 13, 2020

(51) Int. Cl.
*B60R 21/00* (2006.01)

(52) U.S. Cl.
CPC ...... *B60R 21/00* (2013.01); *B60R 2021/0016* (2013.01)

(58) Field of Classification Search
CPC .................. B60R 21/00; B60R 2021/0016
See application file for complete search history.

(56) References Cited

U.S. PATENT DOCUMENTS

| | | | | |
|---|---|---|---|---|
| 5,113,779 A * | 5/1992 | Amrein | ...................... | F41H 7/02 114/68 |
| 6,070,546 A * | 6/2000 | Downey | ................. | B63B 43/14 114/123 |
| 7,287,482 B1 * | 10/2007 | Banchetto | ............... | B63B 43/14 114/123 |
| 7,681,515 B1 * | 3/2010 | Apple | ...................... | B63C 9/22 114/365 |
| 9,139,270 B2 * | 9/2015 | Pirtle | ........................ | B63C 7/12 |
| 9,290,144 B1 * | 3/2016 | Cox | ....................... | B60R 21/013 |
| 10,300,754 B2 * | 5/2019 | Miller | ................... | B60F 3/0038 |
| 2006/0043712 A1 * | 3/2006 | Hakki | ................... | B60R 19/205 280/735 |
| 2008/0276852 A1 * | 11/2008 | Farris | ....................... | B63C 9/24 114/68 |
| 2013/0305977 A1 * | 11/2013 | Dondurur | ............. | B60F 3/0038 114/68 |

* cited by examiner

*Primary Examiner* — S. Joseph Morano
*Assistant Examiner* — Jovon E Hayes
(74) *Attorney, Agent, or Firm* — Lawrence G. Fridman, Esq; Feigin & Fridman, LLC (57) ABSTRACT

A system including a flotation mechanism incorporated into a chassis or framework constituent of a vehicle, the flotation mechanism is operable for protecting a vehicle from losses in cases of vehicle drowning accidents; an airbag implement for keeping the vehicle afloat or above water; a cylinder implement for housing the airbag implement, wherein the cylinder implement having two half cylinders that is configured to swing open when activated; a hinge implement including a continuous hinge that is configured to hold the two half cylinders together and allow the two half cylinders to swing open; and a sensor implement for detecting a presence of water or liquid flooding a vehicle, wherein the sensor implement is further configured to send an emergency signal the flotation mechanism, for the flotation mechanism to deploy the airbag implement.

19 Claims, 4 Drawing Sheets

VEHICLE FLOTATION SYSTEM

CROSS-REFERENCE TO RELATED APPLICATIONS

Not applicable.

RELATED CO-PENDING U.S. PATENT APPLICATIONS

Not applicable.

INCORPORATION BY REFERENCE OF SEQUENCE LISTING PROVIDED AS ATEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to floating devices. More particularly, certain embodiments of the invention relate to systems and methods for generally protecting vehicles from losses in cases of flood and prevent loss of life in cases of vehicle drowning accidents.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Very little is known about drowning deaths that occur as a result of motor vehicle traffic accidents. The primary data source for this analysis is the linked Fatality Analysis Reporting System (FARS)—Multiple Cause of Death (MCoD) file that is produced by the National Highway Traffic Safety Administration 's (NHTSA) National Center for Statistics and Analysis (NCSA) in collaboration with the Centers for Disease Control (CDC). The years used for the analysis start with 2004 and end with 2007. From 2004 through 2007, there was an annual average of 384 traffic fatalities in FARS where accidental drowning was listed as one of the causes of death. Note, however, that this number may be slightly lower than the national total because of missing MCoD data from two States (Hawaii and Wisconsin). Also a few fatalities from December 2007 crashes may not have matching mortality data because the death occurred in January 2008. Drowning fatalities are more common in some States than in others. The top five States, which are all large coastal States, accounted for slightly more than half of the total drowning deaths in the 48 States and D.C. The occupants' motor vehicles included a wide range of body types from passenger cars and pickups to motorcycles. However, the passenger vehicle category, accounted for 94 percent of the drowning fatalities from 2004 through 2007.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that flotation devices which may provide buoyant assistance to a person immersed in water in maintaining a portion of their body above a water's surface long have been known in the art. Such devices have been used for safety and rescue purposes as well as for recreation and amusement. These devices have taken various forms including life vests, water wings, small rafts, and toroidally shaped life preservers. An exemplary form of such a device is a water toy including a tube or noodle. This device is puncture resistant and may be used as floating toy. The tube or noodle has also been used in conjunction with other parts such as mesh or cloth pieces to form inexpensive water loungers, rafts and chairs. Another flotation device used in swimming pools and other swimming areas is a pool noodle having an elongated member formed of flexible Styrofoam and other closed cell foam material. These pool noodles are typically five to six feet in length having a diameter of approximately three to six inches and are quite enjoyable for swimming pool play and simply floating relaxation in water. Another exemplary form of such a device, used primarily for recreational purposes, is an elongate noodle-type device with free ends formed of soft, deformable, buoyant, plastic, and/or closed-cell foam material. These devices may be placed between the legs, or across the chest and under the arms, or across the back and under the arms by a user to provide buoyant support and assistance. Although pool noodles are bendable from a relaxed straight configuration with some stiffness with respect to the foam construction material itself, these swimming pool play and flotation devices require some continuing effort to maintain them in a curved, behind the neck or under the torso in-use position which may be uncomfortable and tiring. When used for recreation and amusement, these noodle-type personal flotation devices of the prior art are passive, generally offering only a buoyant force for flotation assistance and playful resistance.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is an illustration of an exemplary vehicle flotation system, in accordance with an embodiment of the present invention.

FIG. 4 is an exemplary vehicle flotation system surrounded by water, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof, relate to systems and methods for generally protecting vehicles from losses in cases of flood and prevent loss of life in cases of vehicle drowning accidents. In one embodiment of the present invention, vehicles are protected from sinking underwater with flotation devices placed around individual vehicles. Flotation devices may be disposed in a front (for example in the bumper of the vehicle), a back (for example the trunk of the vehicle), sides (for example, passenger side and driver side of the vehicle) and under the vehicles (for example, around the chassis of the vehicle). Each flotation device disposed around the vehicle may hold one or more airbags. When the flotation device is activated by sensors during an impact with water, for example, during a flood, the device opens and the one or more airbags held inside the flotation device get deployed. The deployment of the airbags may support the weight of the vehicle, preventing the vehicle from sinking underwater. Sensors may include, but not limited to, water sensors, water level sensors, and/or water leakage detectors, may detect water, water level, and/or water leakage during impact and the flotation devices open. This allows the airbags stored inside the flotation devices to deploy, therefore the vehicle is able to float and will not sink. The flotation device may include various materials such as rubber, plastic, metal, or a combination of such materials. The flotation device may further include various shapes such as but not limited to cylindrical, square, rectangular, triangular, or a combination of such shapes. For example, the flotation device may include cylindrical or elongated rubber tubes, plastic tubes, metal tubes, etc. The airbags may comprise of flexible and waterproof material(s) such as but not limited to, nylon airbags. The vehicle may include, but not limited to, small vehicles, medium sized vehicles, full-sized vehicles, vans, utility vehicles, sports vehicles, etc.

The present invention will now be described in detail with reference to embodiments thereof as illustrated in the accompanying drawings.

Figure 1:
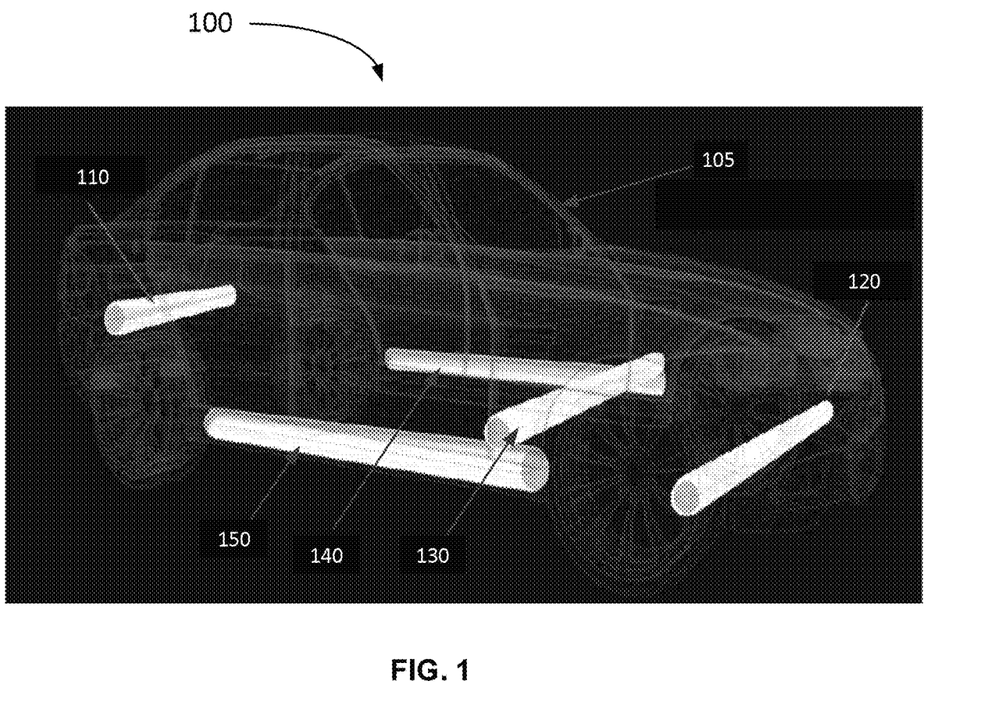
FIG. 1 is an illustration of an exemplary vehicle flotation system for generally protecting vehicles from losses in cases of flood and prevent loss of life in cases of vehicle drowning accidents, in accordance with an embodiment of the present invention.

FIG. 1 is an illustration of an exemplary vehicle flotation system 100, in accordance with an embodiment of the present invention. In the present embodiment shown, the vehicle flotation system 100 may comprise of flotation devices placed around a vehicle. The flotation devices are configured to be operable for generally protecting a vehicle from losses in cases of flood and prevent loss of life in cases of vehicle drowning accidents. The vehicle 105 is equipped with a front/bumper flotation device 120, a back/trunk flotation device 110, a passenger side flotation device 150, a driver side flotation device 140, and vehicle mid-section flotation device 130. The flotation devices may comprise of, but not limited to, a cylindrical rubber, plastic, and/or metal tubes. Alternatively, the flotation devices may comprise of, but not limited to, an elongated square rubber, plastic, and/or metal containers. Each flotation device may hold at least one or more airbags. The airbags may comprise of flexible and waterproof material(s) such as, but not limited to, nylon fabric airbags. The flotation devices may be incorporated with, but not limited to, a chassis, a framework, a frame, a front bumper, and/or a rear bumper of a vehicle.

FIG. 2 is an illustration of an exemplary vehicle flotation system 200, in accordance with an embodiment of the present invention. In the present embodiment shown, a vehicle 105 is equipped with a front/bumper flotation device 120, a back bumper/trunk flotation device 110, a passenger side flotation device 150, a driver side flotation device 140, and vehicle mid-section flotation device 130.

Figures 2A, 2B, 2C:
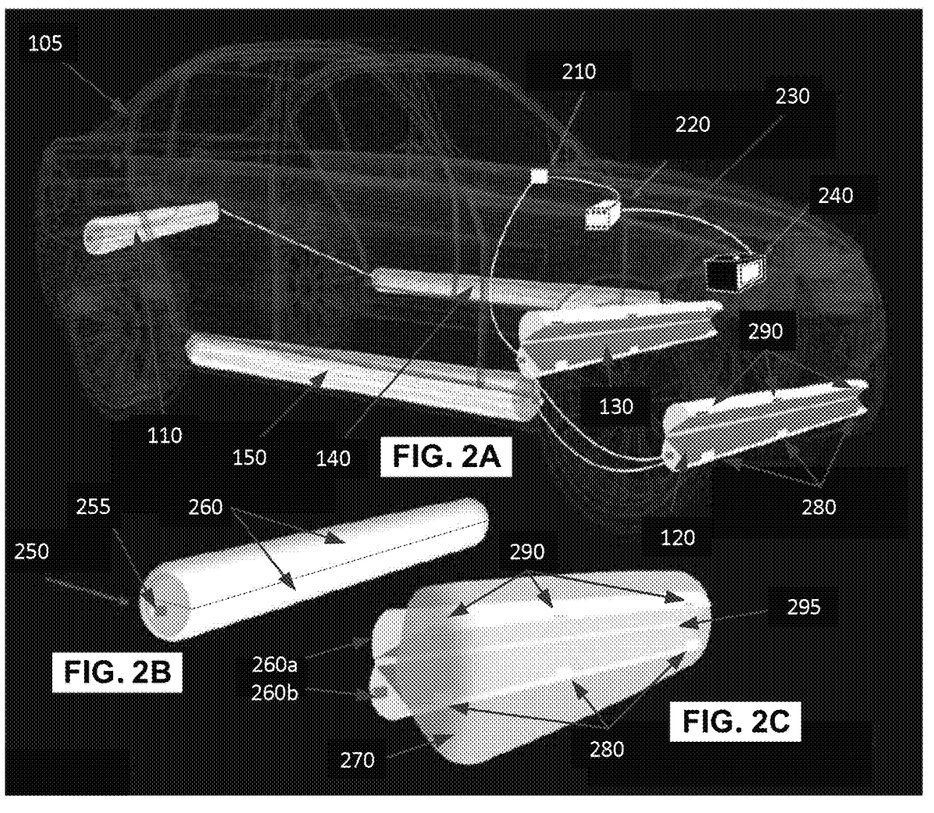
FIG. 2A is an illustration of an exemplary vehicle flotation system showing the interconnections of the flotation devices with a wiring.
FIG. 2B shows a closed individual flotation device 250 with un-deployed airbag(s).
FIG. 2C shows a flotation device with deployed airbag(s)

In FIG. 2A, the front/bumper flotation device 120, a back/trunk flotation device 110, a passenger side flotation device 150, a driver side flotation device 140, and vehicle mid-section flotation device 130 are interconnected with a wiring 230. The flotation devices are connected to a switch implement 210 located inside the vehicle cabin. The switch implement 210 is connected to a sensor device 220, which is connected to a vehicle battery 240. The sensor device 220 may comprise, but not limited to, a water/liquid Detection Sensor, limit switches, etc. The sensor device 220 detects the presence of water around the vehicle. In one embodiment, when the sensor device 220 detects the presence of water around the vehicle, such as but not limited to, water flooding the vehicle, the sensor device 220 may send a signal to the switch implement to trigger a deployment of one or more airbag(s) 270. In an additional embodiment, when the sensor device 220 detects the presence of water around the vehicle, such as but not limited to, water flooding the vehicle, the sensor device 220 may directly send a signal to the flotation device mechanism to trigger a deployment of one or more airbag(s) 270 that may be contained within the flotation device. The switch implement 210 may comprise, but not limited to, manual/mechanical or automatic/electronic switches or a combination of both. Mechanical switches may include, but not limited to, Single Pole Single Throw Switches (SPST), Single Pole Double Throw Switch (SPDT), Push Button Switches, Toggle Switches, etc. The sensor device 220 and/or switch implement 210 may deploy the flotation devices. For example, once the sensor device 220 detects water around the vehicle and/or manual switch 210 is/are triggered, the flotation devices disposed around the vehicle deploys the airbags contained within the flotation devices. For example, the front flotation device 120 and the mid-section flotation device 130 opens, as shown, to deploy the airbags contained within the flotation devices.

FIG. 2B shows an individual flotation device 250 in a closed position with un-deployed airbag(s). The individual flotation devices 250 may contain one or more airbags. Individual flotation devices 250 may comprise of various lengths. In instances where two airbags are contained within the flotation device 250, both airbags may be deployed at the same time. In instances where only one airbag is contained in the flotation device 250, the length of this single airbag flotation device may be shorter than the length of the double airbag flotation device. The length of a triple airbag flotation device may be longer than the length of the double airbag flotation device and so on. The flotation device 250 may include a cylinder implement 260. The cylinder implement 260 may comprise of two half cylinders 260a 260b held with a hinge implement and locking implements. In alternative embodiments, each of the two half cylinders 260 may comprise of two or more partitions. For example, two partitions may allow only one partition to open while the other partition remains closed. In instances where two airbags are contained in the flotation device 250, only one airbag may deploy while the other airbag remains contained. A waterproof pass-through 255 may allow wiring to be installed inside the flotation device 250 without water leaking inside the flotation device.

FIG. 2C shows an individual flotation device 250 in an open position. The lock implement 280 290 may comprise of, but not limited to, snap and hook fastening, snap fit fastening, etc. The lock implement 280 290 may further comprise of, but not limited to, automatic locks, electronic locks and/or electronic keyed or keyless locks, that may be remotely opened through wired or wireless communication. The lock implement 280 290 may lock the flotation device 250 when not in use, for security purposes and/or for anti-theft purposes. The hinge implement 295 for holding two half cylinders 260 may comprise of, but not limited to swing, continuous, or piano hinges that run the whole length of the flotation device. In alternative embodiments, the hinge implement 295 may comprise of, but not limited to butt or mortise hinges where two or more butt hinges are used. In additional embodiments, the hinge implement 295 may further comprise of barrel hinges, flush hinges, pivot hinges, spring loaded hinges, etc. In some embodiments, the whole length of the flotation devices 250 may comprise of two half cylinders 260 held together by the hinge implement 295, where the two half cylinders 260 may open like swing doors when activated. When the two half cylinders 260 open, one or more airbag(s) 270 may deploy. In instances where two airbags are contained within the flotation device 250, both airbags may be deployed at the same time. In other embodiments, the two half cylinders 260 may be partitioned into two or more pieces so that only a portion of the cylinders along the length of the flotation devices may open. Like swinging cylinders 260 that open along a portion of the length of the flotation devices. In other embodiments, the airbag 270 is made of flexible and waterproof material(s) such as, but not limited to, nylon, Dacron or Kevlar fabric material, which is folded into the flotation devices 250. The sensor device 220 and/or switch implement 210 may tell the lock implement 280 290 to open. In turn, the cylinders 260 open and the airbag 270 inflates.

Figure 3:
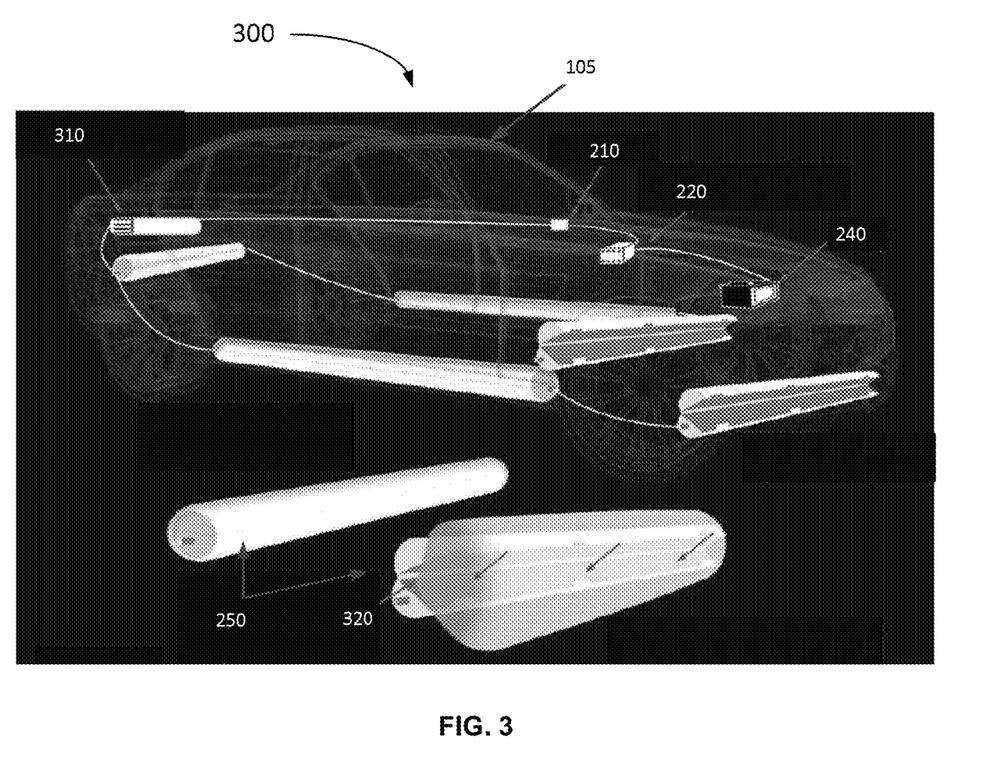
FIG. 3 is an illustration of an exemplary vehicle flotation system with an manual air pump, in accordance with an embodiment of the present invention.

FIG. 3 is an illustration of an exemplary vehicle flotation system with an air pump, in accordance with an embodiment of the present invention. In the present embodiment shown, the elements shown in FIG. 3 are the same in FIG. 2 except for the addition of the air pump device 310. As shown in FIG. 3, the air pump 310 is disposed inside the trunk of the vehicle 105. Air produced in the air pump 310 goes to the airbags. The air pump 310 may comprise of, but not limited to, a manual air pump, automatic air pump, reversible air pump, etc. In additional embodiments, a reversible switch may revert the airbag(s) inside the flotation device after deployment. As such, there is no need to change airbag(s) or flotation devices upon deployment. In some embodiments, the air pump suctions the air out of the airbag(s) to facilitate in the reversion of the airbag(s) inside the flotation device.

Figure 4A:
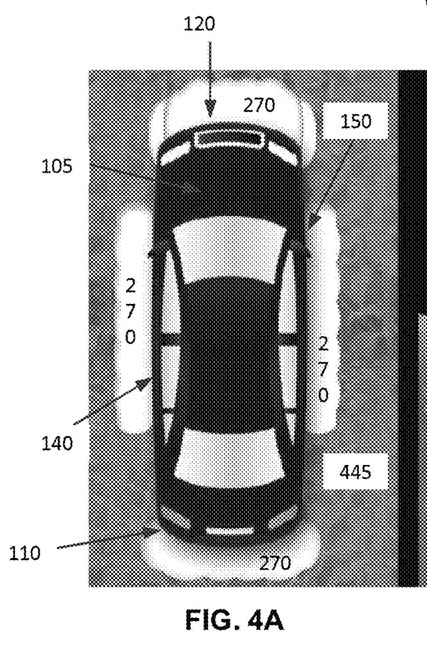
FIG. 4A is a top view illustration of an exemplary vehicle flotation system with deployed flotation devices.
Figure 4B:
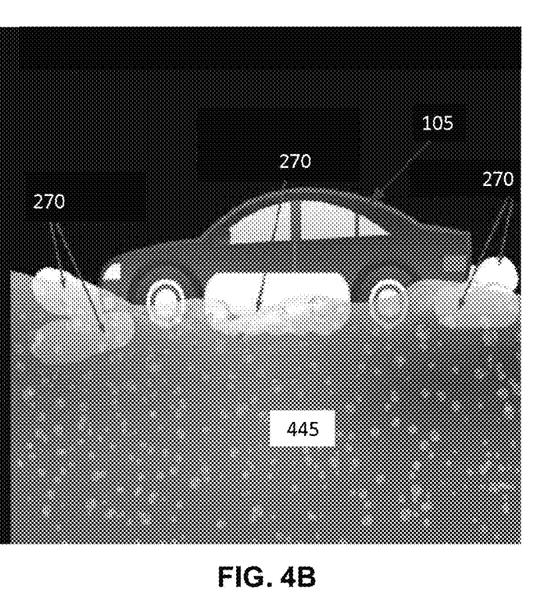
FIG. 4B is an illustration of a side view of an exemplary vehicle flotation system with deployed flotation devices.

FIG. 4 is an illustration of an exemplary application 400 of vehicle flotation system 100, in accordance with an embodiment of the present invention. In the present embodiment shown, the vehicle 105 is surrounded with water 445 and the sensor 220 and/or the manual switch 210 is/are triggered. The flotation devices 110 120 140 150 disposed around the vehicle 105 opens to deploy the airbag implement 270 contained within the flotation devices. FIG. 4A is an illustration of a top view of the exemplary application of the vehicle flotation system 100. FIG. 4B is a side view illustration of the exemplary application of the vehicle flotation system 100. In FIGS. 4A and 4B, the vehicle 105 is surrounded with water 445 and the airbag implement 270 contained within the flotation devices 110 120 140 150 disposed around the vehicle 105 are deployed to keep the vehicle afloat or keep the vehicle from sinking which may allow time for the operator to call for help or immediate assistance. In FIG. 4B, the airbag implement 270 contained within the front and rear flotation devices 120 110 may comprise of two airbags each. While the airbag implement 270 contained within the driver and passenger side flotation devices 140 150 may comprise of single airbags. The airbags may further protect the vehicle from impact.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post MA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post MA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post MA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing systems for generally protecting vehicles from losses in cases of flood and prevent loss of life in cases of vehicle drowning accidents according to the present invention will be apparent to those skilled in the art. Various aspects of the invention have been described above by way of illustration, and the specific embodiments disclosed are not intended to limit the invention to the particular forms disclosed. The particular implementation of the system for generally protecting vehicles from losses in cases of flood and prevent loss of life in cases of vehicle drowning accidents may vary depending upon the particular context or application. By way of example, and not limitation, the system for generally protecting vehicles from losses in cases of flood and prevent loss of life in cases of vehicle drowning accidents described in the foregoing were principally directed to protecting vehicles from losses in cases of flood and prevent loss of life in cases of vehicle drowning accidents implementations; however, similar techniques may instead be applied to buses, railway systems, trucks, etc., which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising: a flotation mechanism, said flotation mechanism being incorporated into at least one of, a chassis constituent, a framework constituent, a frame constituent, a front bumper constituent, and a rear bumper constituent of a vehicle, wherein said flotation mechanism is configured to be operable for protecting a vehicle from losses in cases of flood or prevent loss of life in cases of vehicle drowning accidents; an airbag implement incorporated to said flotation mechanism, wherein said airbag implement is configured to keep the vehicle, at least one of, afloat, above water, and from sinking during a flood or when water around the vehicle rises; a cylinder implement integrated into said flotation mechanism, said cylinder implement is configured to contain said airbag implement, wherein said cylinder implement comprises at least two half cylinders that is configured to swing open when activated; a hinge implement, said hinge implement comprises at least one of, a mortise hinge and a continuous hinge that is configured to hold said two half cylinders together, wherein said hinge implement is additionally configured to be operable for allowing said two half cylinders to swing open; and a sensor implement, said sensor implement is configured to detect a presence of water or liquid flooding a vehicle, wherein said sensor implement is further configured to send an emergency signal said flotation mechanism, for said flotation mechanism to deploy said airbag implement.

2. The system of claim 1, further comprising at least a locking implement, said locking implement is configured to lock said cylinder implement when not in use or for security or anti-theft purposes.

3. The system of claim 2, in which said locking implement comprises an electronic locking implement that is configured to receive said emergency signal for deploying said airbag implement.

4. The system of claim 3, further comprising at least a switch implement, said switch implement is configured to trigger a deployment of said airbag device.

5. The system of claim 4, in which said switch implement comprises at least one of, a mechanical switch and an electronic switch.

6. The system of claim 5, wherein said mechanical switch is configured to be operable for manual control by an occupant of the vehicle in triggering a deployment of said airbag device.

7. The system of claim 6, wherein said electronic switch is configured to be operable for activation by said sensor implement electrically coupled to said electronic switch.

8. The system of claim 7, further comprising at least an air pump device, said air pump device is configured to provide air to said airbag implement.

9. The system of claim 8, in which said flotation mechanism comprises at least a vehicle back flotation device disposed on an outer portion of a trunk of the vehicle.

10. The system of claim 9, in which said flotation mechanism further comprises at least a vehicle passenger side flotation device.

11. The system of claim 10, in which said flotation mechanism further comprises at least a vehicle driver side flotation device.

12. The system of claim 11, in which said flotation mechanism further comprises at least a vehicle mid-section flotation device.

13. The system of claim 12, in which said flotation mechanism further comprises at least a vehicle front flotation device disposed on a portion of a front bumper of the vehicle.

14. The system of claim 2, in which said locking implement comprises at least three electronic locks for security or anti-theft purposes.

15. A system comprising: a flotation mechanism, said flotation mechanism being incorporated into at least one of, a chassis constituent, a framework constituent, a frame constituent, a front bumper constituent, and a rear bumper constituent of a vehicle, wherein said flotation mechanism is configured to be operable for protecting a vehicle from losses in cases of flood or prevent loss of life in cases of vehicle drowning accidents; an airbag implement incorporated to said flotation mechanism, wherein said airbag implement is configured to keep the vehicle, at least one of, afloat, above water, and from sinking during a flood or when water around the vehicle rises; a cylinder implement integrated into said flotation mechanism, said cylinder implement is configured to contain said airbag implement, wherein said cylinder implement comprises at least two half cylinders that is configured to swing open when activated; a hinge implement, said hinge implement comprises at least one of, a mortise hinge and a continuous hinge that is configured to hold said two half cylinders together, wherein said hinge implement is additionally configured to be operable for allowing said two half cylinders to swing open; and a sensor implement, said sensor implement is configured to detect a presence of water or liquid flooding a vehicle, wherein said sensor implement is further configured to send an emergency signal said flotation mechanism, for said flotation mechanism to deploy said airbag implement.

16. The system of claim 15, further comprising at least a locking implement, said locking implement is configured to lock said cylinder implement when not in use or for security or anti-theft purposes, in which said locking implement comprises an electronic locking implement that is configured to receive said emergency signal for deploying said airbag implement.

17. The system of claim 16, further comprising at least a switch implement, said switch implement is configured to trigger a deployment of said airbag device, in which said switch implement comprises at least one of, a mechanical switch and an electronic switch, wherein said mechanical switch is configured to be operable for manual control by an occupant of the vehicle in triggering a deployment of said airbag device, wherein said electronic switch is configured to be operable for activation by said sensor implement electrically coupled to said electronic switch.

18. The system of claim 17, further comprising at least an air pump device, said air pump device is configured to provide air to said airbag implement.

19. The system of claim 18, in which said flotation mechanism comprises: at least a vehicle back flotation device disposed on an outer portion of a trunk of the vehicle; at least a vehicle passenger side flotation device; at least a vehicle driver side flotation device; at least a vehicle midsection flotation device; at least a vehicle front flotation device disposed on a portion of a front bumper of the vehicle; and wherein said flotation devices are configured to keep the vehicle afloat without tipping.

* * * * *